UNITED STATES PATENT OFFICE.

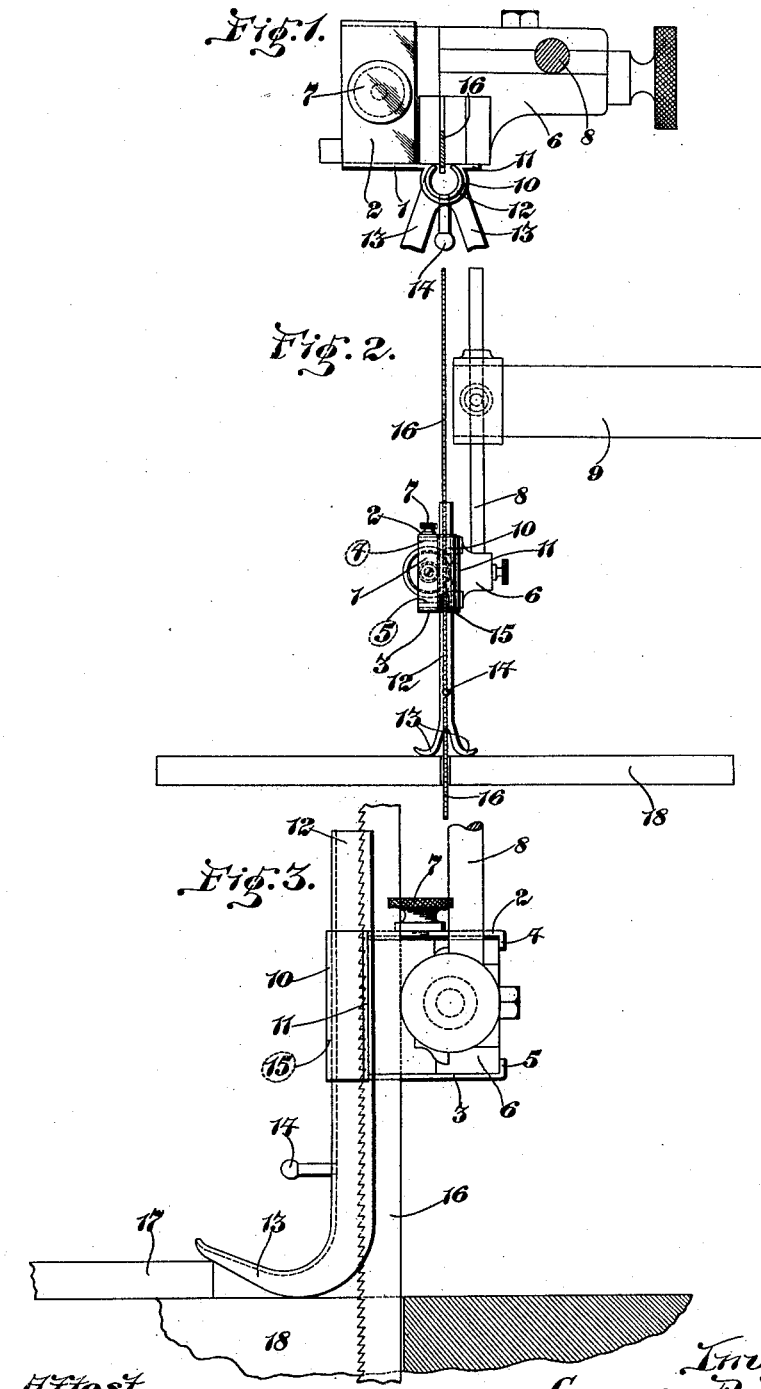

GEORGE P. McDONNELL, OF ST. LOUIS, MISSOURI.

SAW-GUARD.

1,369,824.  Specification of Letters Patent.  Patented Mar. 1, 1921.

Application filed February 18, 1920. Serial No. 359,631.

*To all whom it may concern:*

Be it known that I, GEORGE P. McDONNELL, a citizen of the United States, residing at the city of St. Louis and State of Missouri, have invented a new and useful Saw-Guard, of which the following is a specification.

This invention relates to improvements in saw guards, and more particularly to a guard adapted to be applied to a standard band saw.

An object of the invention is to provide a saw guard arranged for attachment to a standard band saw and which may be utilized without interfering with the ordinary cutting operations of the saw.

Another object of the invention is to provide a saw guard arranged to be applied to a standard band saw which may be automatically lifted so that the work may be fed to the saw, which guard is adjustable with the adjustment of the band saw for sawing blanks of varying thickness.

Additional features of construction inherent in the invention may be readily recognized without specific mention from the following description of the invention, taken in connection with the accompanying drawing, in which—

Figure 1 is a plan view of the construction applied to a band saw.

Fig. 2 is a front elevation.

Fig. 3 is a side elevation.

In the embodiment illustrated in the drawing, the invention is shown as comprising a supporting bracket formed with a front wall 1, said wall having its upper and lower edge back-turned to form a top wall 2 and a bottom wall 3. The rear edges of the top and bottom walls are bent or formed with flanges 4 and 5, respectively. This bracket is adapted to be mounted in connection with the band saw guide 6 of the standard band saw construction, and to be held in adjustment therewith by a set screw 7. It will be understood that in the standard band saw construction the band saw guide 6 is mounted on an adjustable rod 8 supported by a bracket 9 forming a part of the machine. The guide 6 is movable vertically so as to adjust the band saw to cut planks of varying thickness. As the bracket for supporting the guard is mounted in association with the band saw guide it may be raised and lowered with the guide.

The front wall 1 of the supporting bracket is bent or formed at one edge in the form of a semi-cylinder 10 with a laterally projecting flange 11 at the side. The cylinder 10 is so arranged that there is an open space at the rear thereof through which the band saw extends. Within the member 10 is a slotted tube 12 the lower end of which is forked and bent forward and upwardly forming a bifurcated shoe 13. The tube 12 is slidably mounted in the tubular or semi-cylindrical section 10 of the support and is of sufficient weight to move downwardly by gravity. In order to manually lift the saw guard so as to provide a clearance space therebeneath to feed the work to the band saw, a pin 14 attached to the front face of the cylinder 10 near the bottom thereof, is provided. The lower part of the cylinder 10 has a notch 15 therein to receive the pin and to permit the elevation of the guard.

It will be observed that the forward edge of the band saw 16 projects through the slot in the guard so that the edge thereof is incased by the guard. In practice when the work, in the form of a plank 17, is moved on the table 18 of the band saw toward the saw, the edge of the plank engages beneath the forward end of the shoe of the guard, thereby raising the guard so that the plank may be moved into contact with the saw. If the thickness of the plank is greater than the elevation of the forward end of the shoe above the table, the guard may be lifted manually by the pin 14.

It will also be observed that the shoe 13 constitutes a finger guard, preventing accidental engagement with the saw should the hands of the operator slip forward on the work toward the saw.

It is obvious that a guard of this construction may be readily applied to the standard band saw and that it may be utilized without in any wise interfering with the feeding of the work to the saw. Since the guard moves by gravity downwardly toward the table when out of contact with the work, the cutting edge of the saw will be automatically incased and guarded at all times, except during the actual feeding of the work to the saw. It will also be observed that, even during the cutting operations, the part of the band saw above the work will be guarded so that there will be no accidental contact therewith when the work is moving through the saw.

I am aware that the invention may be improved in certain particulars without departure from the spirit and scope of the invention. I do not limit myself therefore to the exact construction and arrangement described, but what I claim and desire to secure by Letters Patent, is:—

1. A guard, comprising a support adapted to be removably attached to a band saw guide, a vertically slidable member mounted in said support incasing the saw, and means operable incidentally to the movement of the work to the saw for moving the guard to uncover the cutting edge of the saw for sawing operations.

2. A saw guard, comprising a support, a slotted tubular member supported in the support adapted to receive and incase the cutting edge of the saw, a shoe in connection with said member inclining upwardly from the band saw table, and means for manually raising said member.

3. In a band saw, the combination of a table, a band saw, a saw guide for said saw, a support adapted to be removably attached to said guide, a vertically movable member in said support arranged to incase the cutting edge of the saw, and means in connection with said member for raising the same when work is fed to the saw.

4. In a band saw, the combination with a table, a band saw and a guide for said saw, of a support adapted to be mounted on the saw guide, a semi-tubular bracket in connection with said support having a slot therein for receiving the saw, and a slotted tubular member mounted in said bracket having a bifurcated upwardly extending shoe at the bottom thereof.

5. In a band saw, the combination with a table, a band saw and a guide for said saw, of a support adapted to be mounted on the saw guide, means for holding said support in connection with the saw guide, a semi-tubular bracket in connection with said support having a slot therein for receiving the saw, a slotted tubular member mounted in said bracket having a bifurcated upwardly extending shoe at the bottom thereof, and engaging means for lifting said tubular member.

GEORGE P. McDONNELL.